United States Patent
Kuipers (10) Patent No.: US 12,442,355 B2
(45) Date of Patent: Oct. 14, 2025

(54) METHOD FOR SECURING A BUSHING IN A BLADE ROOT OF A WIND TURBINE BLADE AND CAP FOR USE IN SAID METHOD

(71) Applicant: Viventus Holding B.V., Almelo (NL)

(72) Inventor: Edo Johannes Hendrikus Kuipers, Almelo (NL)

(73) Assignee: Viventus Holding B.V., Almelo (NL)

( * ) Notice: Subject to any disclaimer, the term of this patent is extended or adjusted under 35 U.S.C. 154(b) by 0 days.

(21) Appl. No.: 18/698,090

(22) PCT Filed: Oct. 29, 2021

(86) PCT No.: PCT/NL2021/050661
§ 371 (c)(1),
(2) Date: Apr. 4, 2024

(87) PCT Pub. No.: WO2023/075592
PCT Pub. Date: May 4, 2023

(65) Prior Publication Data
US 2024/0328383 A1 Oct. 3, 2024

(51) Int. Cl.
*F03D 1/06* (2006.01)
(52) U.S. Cl.
CPC .......... *F03D 1/066* (2023.08); *F05B 2230/10* (2013.01)
(58) Field of Classification Search
CPC ..... F03D 1/066; F05B 2230/10; F16B 13/141
See application file for complete search history.

(56) References Cited

U.S. PATENT DOCUMENTS

| | | | |
|---|---|---|---|
| 4,044,512 A | * | 8/1977 | Fischer ............... E04B 1/41 52/704 |
| 11,976,625 B2 | | 5/2024 | Heydlauff et al. |
| 2016/0047355 A1 | | 2/2016 | Feigl |
| 2017/0050372 A1 | | 2/2017 | Nielsen et al. |
| 2019/0375027 A1 | | 12/2019 | Boksem |

(Continued)

FOREIGN PATENT DOCUMENTS

| | | | |
|---|---|---|---|
| CN | 210307149 U | * | 4/2020 |
| EP | 2138716 A1 | | 12/2009 |
| EP | 2728171 A2 | | 5/2014 |

(Continued)

OTHER PUBLICATIONS

International Search Report in PCT application No. PCT/NL2021/050661 mailed Jul. 5, 2022.

(Continued)

*Primary Examiner* — Christopher W Raimund
(74) *Attorney, Agent, or Firm* — Oppedahl Patent Law Firm LLC (57) ABSTRACT

The invention relates to a method for securing a bushing in a blade root of a wind turbine blade according to the preamble of claim 1. The method is known in the state of the art. The known method uses an additional cavity in axial direction of the blade root. The cavities in axial and radial direction are used for accommodation of a T-bolt type bushing. The known method is not suitable for pen-type bushing. The invention has for its purpose to provide a method, which is suitable for securing a pen-type bushing in the blade root, which method can also be used to replace an existing pen-type bushing in a blade root.

8 Claims, 5 Drawing Sheets

(56) References Cited

U.S. PATENT DOCUMENTS

2021/0180572 A1    6/2021    Thiebaut

FOREIGN PATENT DOCUMENTS

| | | | |
|---|---|---|---|
| GB | 2569297 A | | 6/2019 |
| NL | 2024169 B | | 7/2021 |
| WO | WO84/01601 | * | 4/1984 |
| WO | WO-2011069511 A1 | * | 6/2011 ......... B29C 35/0805 |
| WO | WO2012172132 A1 | | 12/2012 |
| WO | WO2017101944 A | | 6/2017 |
| WO | WO2019110071 A1 | | 6/2019 |

OTHER PUBLICATIONS

Written Opinion in PCT application No. PCT/NL2021/050661 mailed Jul. 5, 2022.

* cited by examiner

METHOD FOR SECURING A BUSHING IN A BLADE ROOT OF A WIND TURBINE BLADE AND CAP FOR USE IN SAID METHOD

The invention relates to a method for securing a bushing in a blade root of a wind turbine blade according to the preamble of claim 1.

The method is known in the state of the art.

The known method uses an additional cavity in axial direction of the blade root. The cavities in axial and radial direction are used for accommodation of a T-bolt type bushing.

The known method is not suitable for pen-type bushing, otherwise knows as a bolt sleeve type bushing.

The invention has for its purpose to provide a method, which is suitable for securing a pen-type bushing in the blade root, which method can also be used to replace an existing pen-type bushing in a blade root.

The method according to the invention therefore provides a method according to the preamble of claim 1, characterizing in that the method has the following additional steps:

d): selecting a rod for placement in the inner bushing channel, having an inner rod channel running from a first outer rod end to a second outer rod end and placing the rod in the inner bushing channel;

e): filling the space between the cavity and the bushing with a bonding compound to secure the bushing in the cavity thereby letting the bonding compound flow through the inner rod channel while sealing off the inner bushing channel at the second outer bushing end;

f): allowing the compound to cure until the bushing is secured in the cavity;

g): removing the rod from the bushing;

h): flatten the face of the blade root effected by the preceding steps.

Said technical measures have the technical effect that the bushing can be placed and secured in the cavity, without having the need of a cavity in axial direction.

In order to protect the inner bushing channel of the bushing, which usually has an inner thread, the method preferably comprises between step b) and step c) intermediate step bc): selecting and placing a sealing element in the inner bushing channel near the second outer end of the bushing for sealing off the inner bushing channel at the second outer bushing end in step e), which sealing element has a first through channel.

In a preferable embodiment of the method according to the invention, step c) comprises sub step c1): securing a closing element to the blade root in an airtight manner, thereby closing the cavity, wherein the closing element comprises a through hole to pass through the rod and wherein the closing element comprises in secured position one or more openings between a free face of the closing element and the space between the cavity and the bushing. These measures ensure that the bonding compound stay in the space between the cavity and the bushing, while aligning the bushing during curing of the bonding compound.

Preferably, in sub step c1) the closing element is attached to the first outer bushing end before placing and aligning the bushing in the cavity.

In the preferable embodiment of the method according to the invention. in step e) the bonding compound is inserted in the cavity via a free end of the inner rod channel, thereby flowing;

through the inner rod channel via the first outer rod end;
through the through channel of the sealing element to the end of the cavity;
from the end of the cavity towards the first end of the bushing thereby filling the space between the cavity and the bushing;
through the one or more openings of the closing element, thereby exiting the cavity;

To ensure that the bonding fills the entire space between the cavity and the bushing, in step e) a pressure difference is applied between the free end of the inner rod and the openings during insertion of the bonding compound.

As an alternative, wherein the flow of the compound is reversed, in step e) the bonding compound is inserted in the cavity via one or more the openings of the closing element, thereby flowing;

from the first end of the bushing towards the end of the cavity thereby filling the space between the cavity and the bushing;
from the end of the cavity towards the sealing element;
through the through channel of the sealing element to the inner rod channel;
through the inner rod channel towards the first outer end of the bushing, thereby exiting the inner rod channel.

Preferably, in step e) a sealing ring is used to sealingly connect the inner rod channel and first through channel. The sealing ring prevents the compound to reach the inner bushing channel.

In the preferable embodiment of the method according to the invention, in step b) the bushing is further selected wherein the inner bushing channel comprises internal thread; and wherein in step d) the rod is further selected, wherein the rod comprises external thread cooperating with the internal thread of the inner bushing channel. This allows for an easy installation of the rod in the bushing.

For further easy execution of the method, in step bc) the sealing element comprises external thread cooperating with the internal thread of the inner bushing channel to secure the sealing element in the inner bushing channel.

To improve the distribution of the compound in the cavity, step bc) comprises the following sub step bc1): selecting and securing a dispensing element to the sealing element, wherein the dispensing element comprises a second through channel, such that the first through channel abuts the second through channel, which dispensing element is arranged to, in operation, dispense the bonding compound from the second through channel to one or more dispensing locations around the circumference of the dispensing element.

Preferably in sub step bc1) a dispensing element is selected wherein the dispensing element comprises the sealing element.

Preferably in step e) the bonding compound is selected from the following set: resin, adhesive.

To increase the strength of the connection of the bushing to the blade root, in step c) the bushing is preferably wrapped in glass fiber roving before placing and aligning the bushing in the cavity.

In a further alternative embodiment of the method according to the invention, in step b) a bushing is selected wherein the circumference of the bushing near the first outer bushing end is more or less equal to the inner circumference of the entry of the cavity, such that after placement of the bushing in the cavity according to step c), the bushing will substantially seal of the entry of the cavity;

sub step c1) before securing the closing element, one or more first dispensing channels are arranged on the outside of the bushing near the first outer bushing end, which first dispensing channels are arranged to allow the bonding compound to pass the sealed entry of the cavity;

sub step c1) the closing element is secured to the first outer bushing end such that the one or more openings of the closing element align with the one or more first dispensing channels.

As mentioned before, the method according to the invention is suitable for replacing an existing bushing in the blade root. Thereto, in step a): the cavity in the blade root is created by removing the existing bushing from the blade root.

Preferably, in step a) the existing bushing is removed from the blade root by drilling out the existing bushing using a drilling machine, wherein a drilling diameter is chosen which is larger than the largest dimension of the cross section of the existing bushing.

The invention also relates to a cap for use in the method, comprising a first section and an adjacent second section, wherein the first section is arranged to form a sealing element, wherein the first section comprises external thread for cooperating with internal thread of an inner bushing channel of a bushing and the second section is arranged to form the dispensing element;

a third through channel forming the first and second through channel.

In a preferred embodiment of the cap according to the invention, the second section comprises one or more second dispensing channels, which are, in operation, arranged to lead the bonding compound from the third channel to the circumference of the second section.

In a more preferred embodiment of the cap according to the invention, which is very suitable for cylindrically shaped cavities, the second section is substantially round and the one or more second dispensing channels are partly arranged in axial direction of the second section thereby connected to the third through channel and partly arranged in axial direction of the second section in direction of the first section.

The invention will now be further elucidated with reference to the following figures, in which.

Like reference numbers in different figures designate equal parts.

FIG. 1A-1F describes steps of the method according to the invention, and will be referenced to in the following preferred embodiment of the method according to the invention.

The first step a) of the preferred embodiment of the method is creating a cavity 103 in the blade root 100. Preferably the cavity 103 is cylindrically shaped and created using a drilling machine. The method according to the invention can also be used to replace an existing bushing in a blade root 100. The service life of a blade root 100 can be extended by replacing all or part of the existing bushings in the blade root 100. The existing bushing is removed from the blade root 100 by drilling out the existing bushing using a drilling machine, wherein a drilling diameter is chosen which is larger than the largest dimension of the cross section of the existing bushing.

The second step b) of the preferred embodiment of the method is selecting a suitable bushing 1, having an inner bushing channel 1*a* running from a first outer bushing end to a second outer bushing end. Preferably the selected bushing 1 is hollow. Otherwise, the selected bushing 1 must be made hollow by expanding the inner bushing channel 1*a*.

Preferably a bushing 1 is selected with well-known and tested capabilities. More preferably, a bushing 1 is selected as described in the European patent EP3111083. Especially if the method according to the invention is used to replace an existing bushing.

Figure 1A:
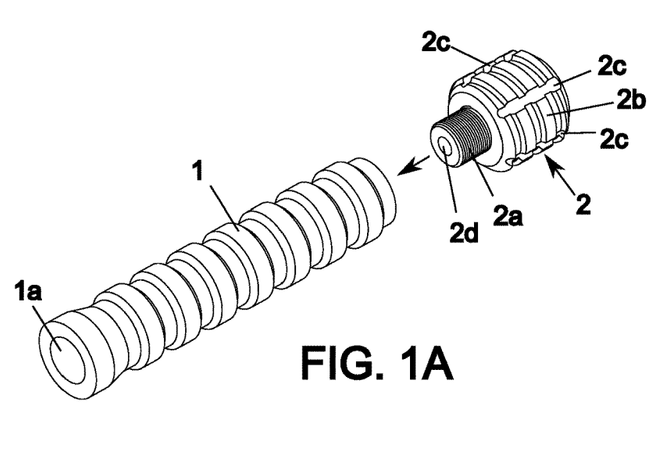
FIG. 1A shows a bushing and a cap according to the invention.

The third step c) of the preferred embodiment of the method is placing and aligning the bushing 1 in the cavity 103. Before placing the bushing 1 in the cavity 103, a cap 2 is placed on the second outer end of the bushing as is shown in FIG. 1A. The cap 2 comprises two sections.

The cap 2 comprises a through channel 2*d*.

The first section 2*a* is arranged to form a sealing element for sealing off the inner bushing channel 1*a* at the second outer bushing end. The sealing element preferably comprises external thread cooperating with the internal thread of the inner bushing channel 1*a* to secure the sealing element in the inner bushing channel 1*a*.

The second section 2*b* is arranged to form a dispensing element, wherein the dispensing element, which dispensing element is arranged to, in operation, dispense the bonding compound from its through channel 2*d* to one or more dispensing locations around the circumference of the dispensing element. Dispensing channels 2*c* are arranged on the outside of the second section 2*b* near the second outer bushing end, which dispensing channels 2*c* are arranged to lead the bonding compound from the through channel 2*d* of the cap 2 to the circumference of cap 2.

Figure 1B:
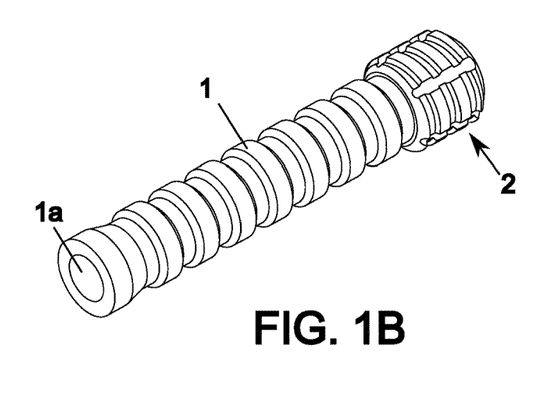
FIG. 1B shows the bushing and cap according to FIG. 1A in assembled state.
Figures 1C, 1D:
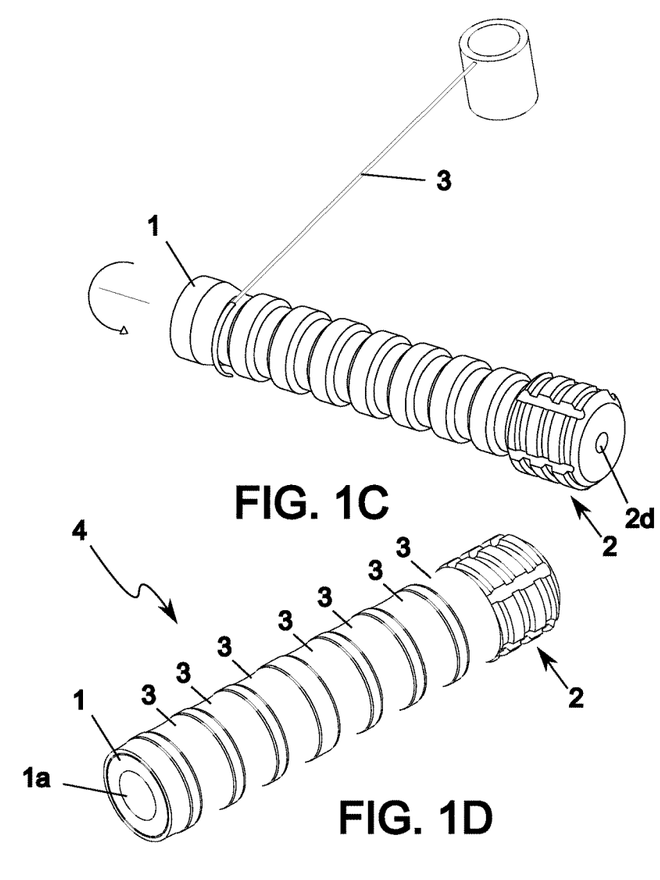
FIG. 1C shows a step of a method according to the invention, wherein glass fiber roving is wrapped around the assembled bushing.
FIG. 1D shows the assembled bushing wrapped in glass fiber roving.

After placing of the cap 2 on the bushing 1, as shown in FIG. 1B, the bushing 1 is preferably wrapped in glass fiber roving 3 to increase the strength of the placed bushing 1, as is shown in FIG. 1C.

The prepared bushing 4 with cap 2 and wrapped in glass fiber roving 3 is shown in FIG. 1D.

Preferably the cavity 103 is cylindrically shaped and the second section 2*b* of the cap 2 substantially round, with a diameter slightly less than the diameter of the cross section of the cavity 103, so that the cap 2 holds the bushing 1 centered in the cavity 103 and in position during execution of the further steps of the method according to the invention.

Figure 1E:
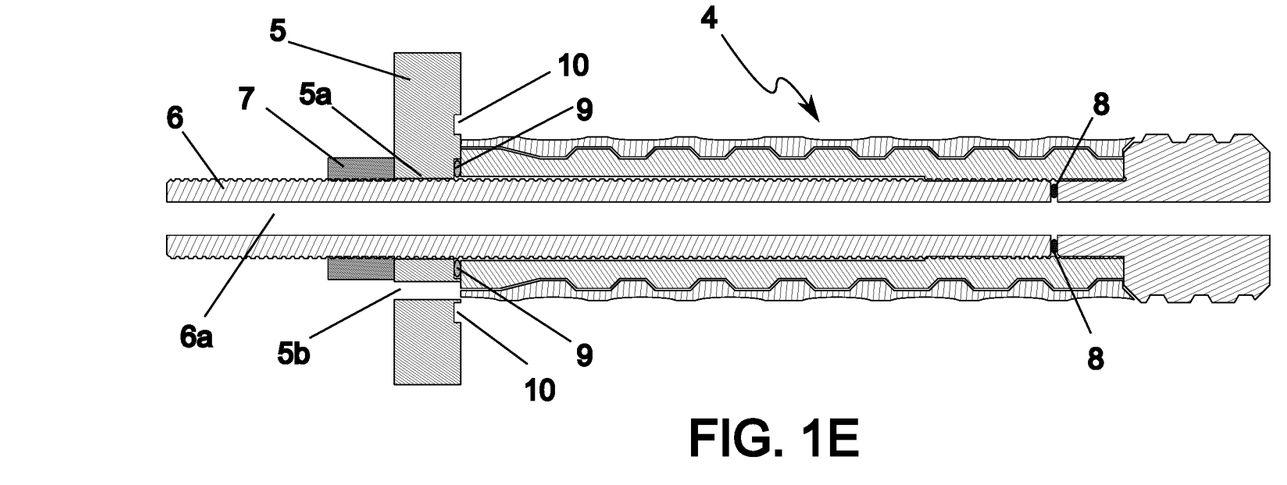
FIG. 1E shows a cross section of the assembled bushing according to FIG. 1D further assembled with the closing element and rod.

The next sub step c1) of the preferred embodiment of the method according to the invention is to secure a closing element 5 to the first outer bushing end before placing and aligning the bushing 1 in the cavity 103, as shown in FIG. 1E. The closing element 5 is used to close the cavity 103, wherein the closing element 5 comprises a through hole to pass through a rod 6 selected in step d) and wherein the closing element 5 comprises in secured position an opening 5b between a free face of the closing element 5 and the space between the cavity 103 and the bushing 1. Preferably the closing element 5 is plate-like and is arranged to be secured to two or more neighboring bushings, thereby aligning the bushing 1 in the cavity 103.

Preferably a sealing ring 9 is used to prevent bonding compound to flow from the space between the bushing and the cavity 103 along the rod 6. A recess is arranged in the closing element 5 to accommodate the sealing ring 9.

Also, preferably another sealing ring is used to prevent bonding compound to flow from the space between the bushing 1 and the cavity 103 along a side of the closing element 5. Another recess 10 is arranged in the closing element 5 to accommodate the sealing ring.

The next step d) of the preferred embodiment of the method according to the invention is selecting a rod 6 for placement in the inner bushing channel 1a, having an inner rod channel 6a running from a first outer rod end to a second outer rod end and placing the rod 6 in the inner bushing channel 1a, as shown in FIG. 1E.

The bushing 1 is secured to the rod 6 by nut 7, which is screwed onto the outer thread of the rod 6.

The inner rod channel 6a abuts the through channel 2d of the cap 2, wherein a sealing ring 8 is used to seal the connecting channels.

Figure 1F:
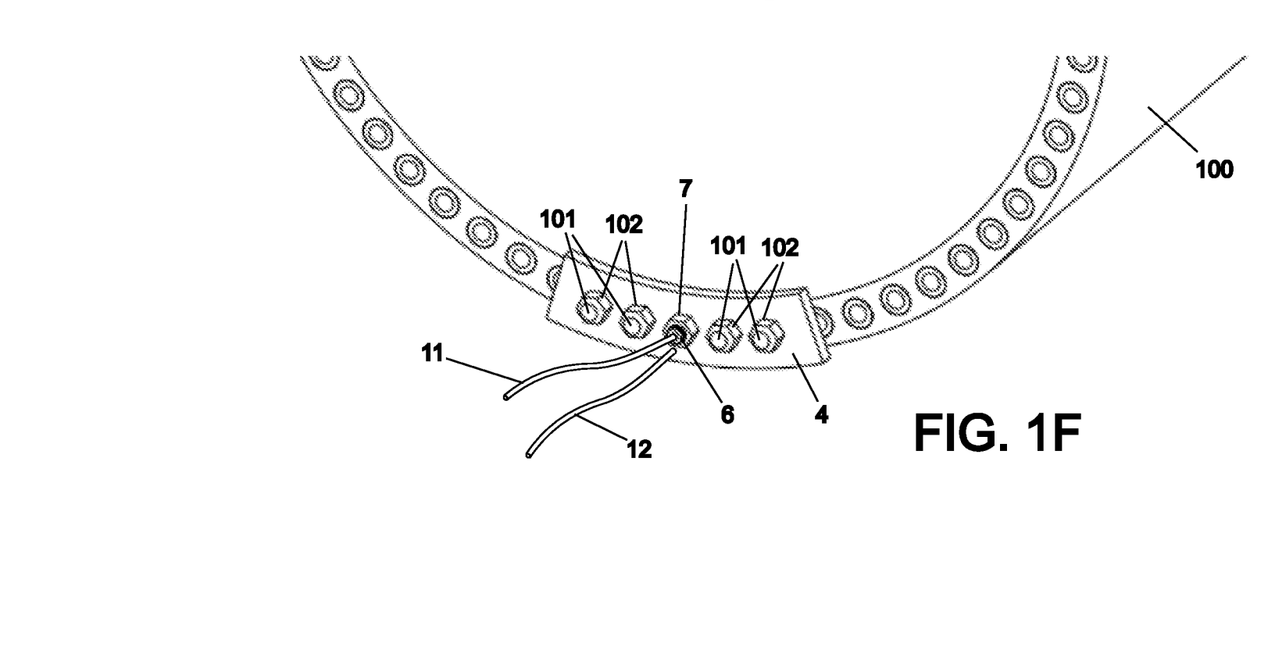
FIG. 1F shows the bushing of FIG. 1E placed and aligned to the blade root using the closing element and provided with an inlet tube and outlet tube for filing cavity in the blade root with bonding compound.
Figure 1G:
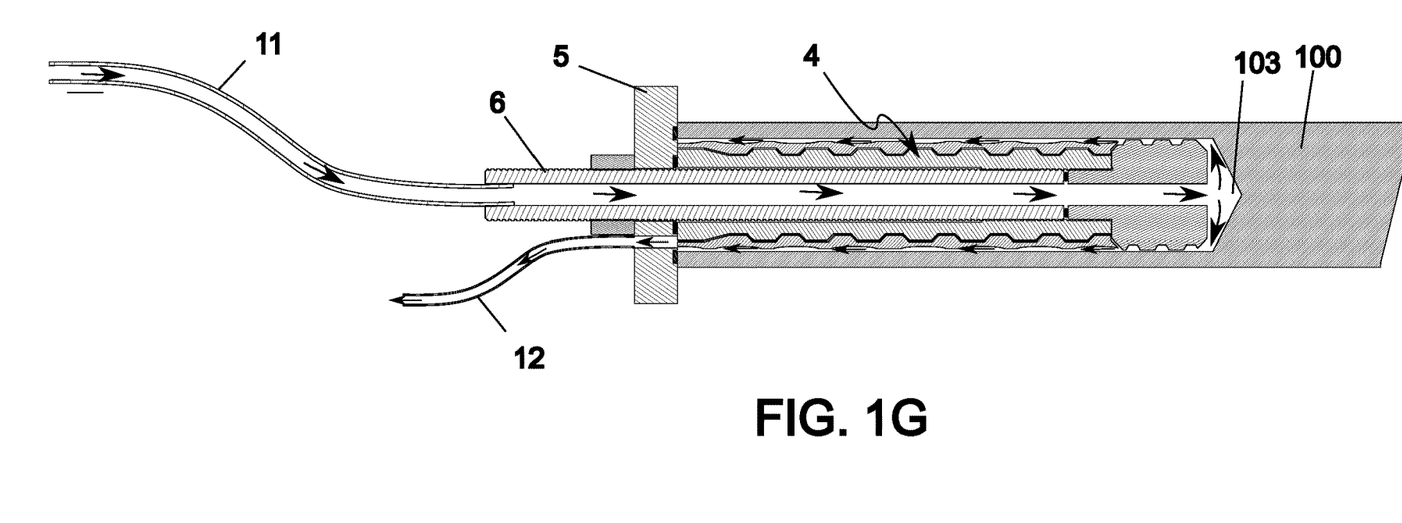
FIG. 1G shows a cross section of the bushing, blade root, closing element and inlet and outlet tubes according to FIG. 1F.

After placing and aligning the assembled bushing 4 with the cap 2 and rod 6 in the blade root 100 using the closing element 5, filling means, such as tubes 11;12, are arranged to the free end of the inner rod channel 6a and to the opening 5b in the closing element 5. This is shown in FIG. 1F.

The closing element 5 is preferably arranged to cooperate with adjacent bushings, so that the closing element 5 can be screwed to the blade root 100 using the thread inserts 101 and bolts 102.

The next step e) of the preferred embodiment of the method according to the invention is filling the space between the cavity 103 and the bushing 1 with a bonding compound to secure the bushing 1 in the cavity 103 thereby letting the bonding compound flow through the inner rod channel 6a while sealing off the inner bushing channel 1a at the second outer bushing end. The bonding compound is thereby inserted in the cavity 103 via a tube 11 to the free end of the inner rod channel 6a, thereby flowing as shown in FIG. 1D by the arrows;

through the inner rod channel 6a via the first outer rod end;
through the through channel of the cap 2 to the end of the cavity 103;
from the end of the cavity 103 through the dispensing channels 2c of the cap 2 towards the first end of the bushing 1 thereby filling the space between the cavity 103 and the bushing 1;
through the opening 5b of the closing element 5, thereby exiting the cavity 103 via a tube 12.

Preferably there is an under pressure in the tube 12 arranged to the opening 5b of the closing element 5, to ensure that the bonding compound will spread through the entire space between the assembled bushing 4 and the cavity 103.

The next step f) of the preferred embodiment of the method according to the invention allowing the compound to cure until the bushing 1 is secured in the cavity 103.

The next step g) of the preferred embodiment of the method according to the invention removing the rod 6 from the bushing 1.

The next step h) of the preferred embodiment of the method according to the invention is flatten the face of the blade root 100 effected by the preceding steps.

Figure 2A:
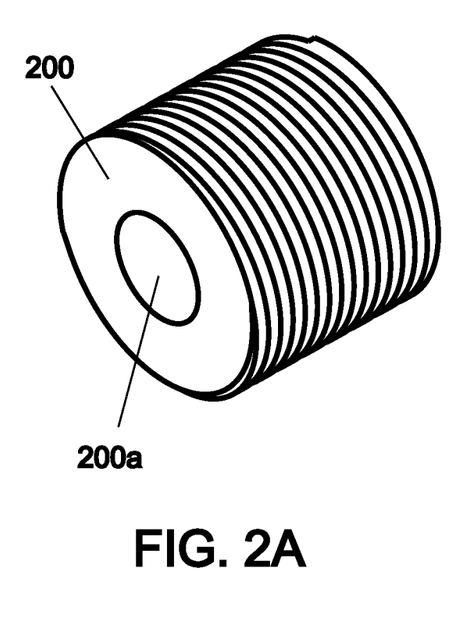
FIG. 2A shows a sealing element for performing the intermediate method step bc)
Figure 2B:
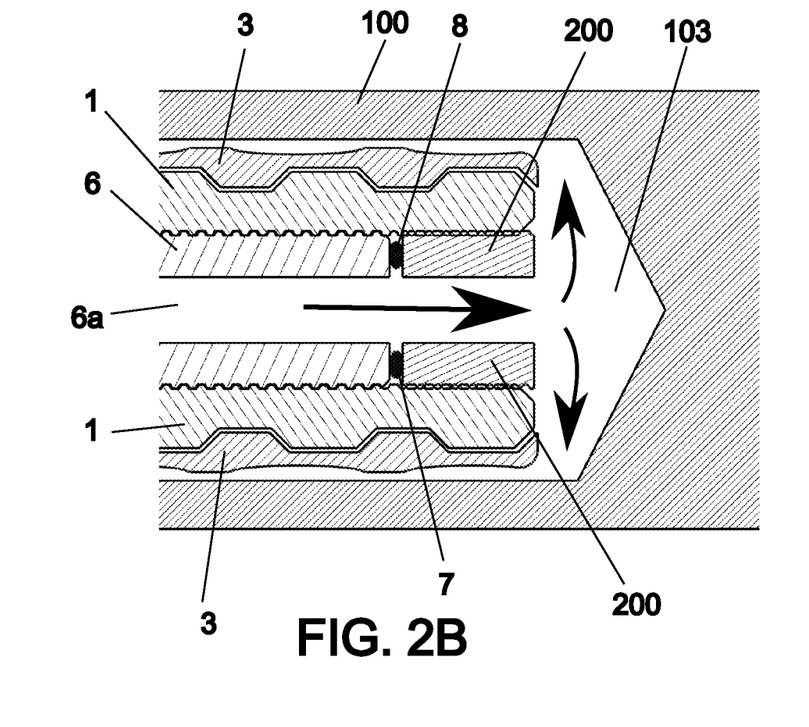
FIG. 2B shows a cross section of an assembled bushing at the second outer bushing end using only the sealing element according to FIG. 2A in the blade root.

In a less preferable embodiment of the method according to the invention, only a sealing element 200 can be used in step c), which sealing element 200 is used to protect an inner thread of the bushing 1. As an example, a suitable sealing element 200 is shown in FIG. 2A, having a through channel 200a. The interface between the second outer end of the rod 6 and the through channel 2a of the sealing element is thereto sealed by a sealing ring 8, as shown in FIG. 2B. The sealed interface also allows for a convenient removal of the rod 6 from the bushing 1 after curing of the bonding compound.

As an alternative, the rod 6 substantially extends to the second outer end of the inner bushing channel 6a, thereby avoiding the need of a sealing element 200. It is expected however, that removal of the rod 6 after curing of the bonding compound is more difficult compared to the use of the sealing element 200.

As an alternative thereto, the rod 6 can be arranged with a weakened second outer rod end, which will break off from the rest of the rod 6 when removing the rod 6 from the bushing 1 after curing of the bonding compound.

Figure 3A:
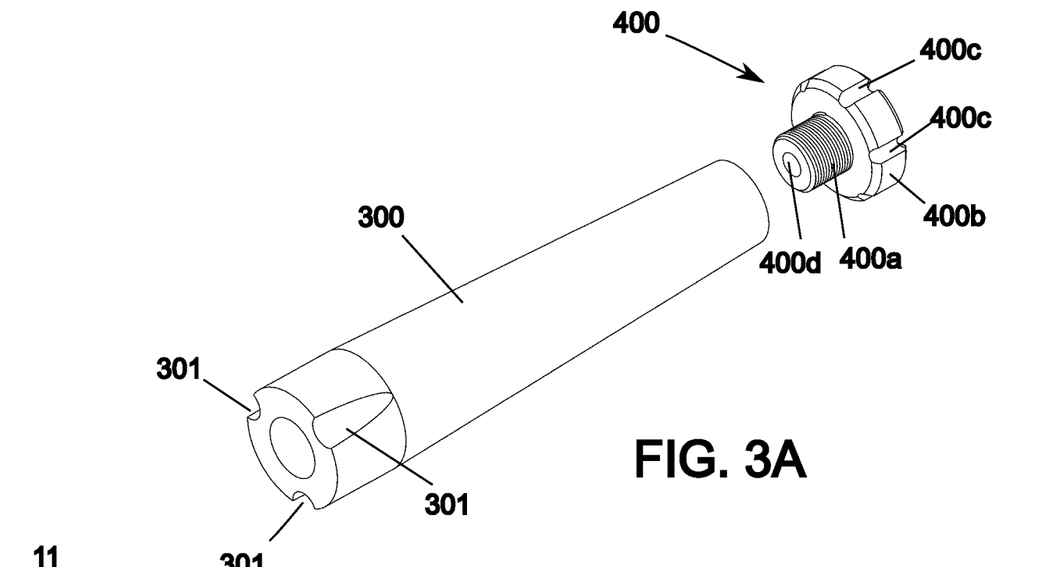
FIG. 3A shows a bushing after performing the method step, wherein first dispensing channels are arranged on the outside of the bushing near the first outer bushing end.

In an elegant embodiment of the method according to the invention, a bushing 300 is selected for further aligning the bushing in the cavity 103 as in shown in FIG. 3A. Thereto, in step b) a bushing 300 is selected wherein the circumference of the bushing 300 near the first outer bushing end is substantially equal to the inner circumference of the entry of the cavity 103, such that after placement of the bushing 300 in the cavity 103 according to step c), the bushing 300 will substantially seal of the entry of the cavity 103;

sub step c1) before securing the closing element 5, one or more first dispensing channels are arranged on the outside of the bushing 300 near the first outer bushing end, which first dispensing channels are arranged to allow the bonding compound to pass the sealed entry of the cavity 103;

sub step c1) the closing element 5 is secured to the first outer bushing end such that the one or more openings 5b of the closing element 5 align with the one or more first dispensing channels.

Figure 3B:
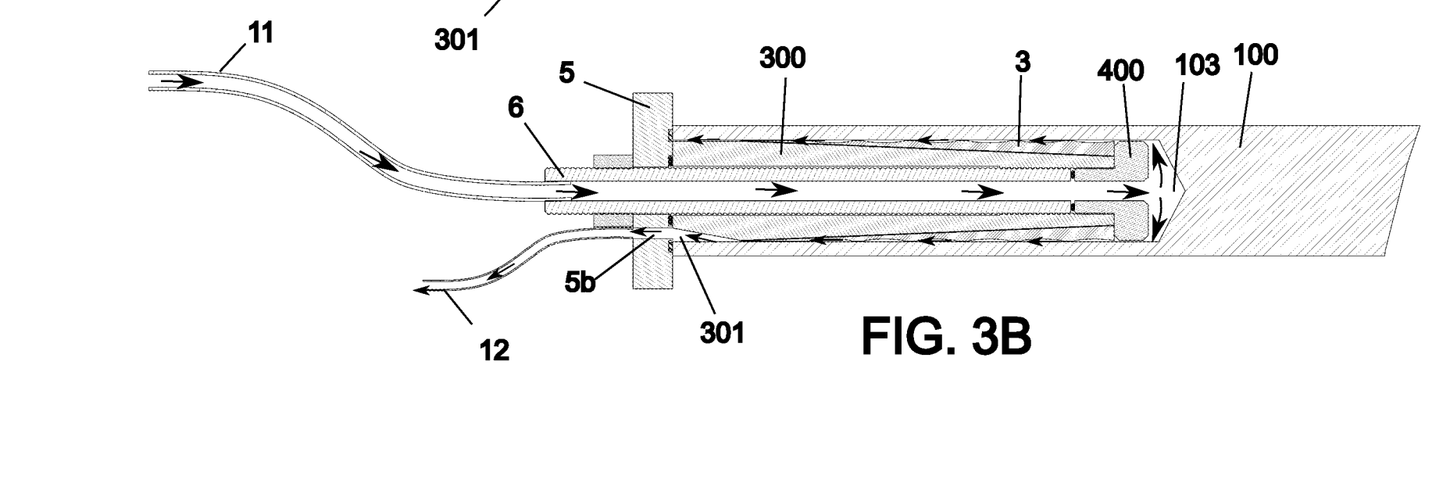
FIG. 3B shows a cross section of an assembled bushing according to FIG. 3A, blade root, closing element and inlet and outlet tubes.

The first dispensing channel allow the bonding compound to leave the cavity 103 in the blade root 100, as is shown in FIG. 3B.

A different type of cap 400 is shown in FIG. 3A also having similar properties as cap 2, such as a first section 400a and second section 400b;
dispensing channels 400c;
a through channel 400d;

The method according to the invention is expressly not limited to the bushings 1;300 as shown in the figures.

The method according to the invention is also not limited to the strict execution of the steps in the shown order. A change of order in the execution of the steps leading to the same result, therefore fall in the scope of the invention as defined by the following claims.

The invention claimed is:

1. A method for securing a bushing (1;300) in a blade root (100) of a wind turbine blade, comprising the following steps:
   a): creating a cavity (103) having an end with an inner circumference in the blade root (100) in axial direction of the blade root (100);
   b): selecting a bushing (1;300), having an inner bushing channel (1a) running from a first outer bushing end to a second outer bushing end, wherein the inner bushing channel (1a) comprises an internal thread;
   bc): selecting and placing a sealing element (2a;200;400a) in the inner bushing channel (1a) near the second outer bushing end (1;300) for sealing off the inner bushing channel (1a) at the second outer bushing end in step e), which sealing element (2a;200;400a) has a first through channel, wherein the sealing element (2a;200;400a) comprises external thread cooperating with the internal thread of the inner bushing channel (1a) to secure the sealing element (2a;200;400a) in the inner bushing channel (1a);
   bc1): selecting and securing a dispensing element to the sealing element (2a;200;400a), wherein the dispensing element comprises a second through channel that abuts the first through channel, which dispensing element has a circumference and is provided with one or more dispensing locations around said circumference, which dispensing element is arranged to, in operation, dispense the bonding compound from the second through channel (2d;400d) to said one or more dispensing locations, wherein the dispensing element is round and said circumference is equal to the inner circumference of the end of the cavity (103) and wherein the sealing element (2a;200;400a) and the dispensing element form a cap;
   c): placing and aligning the bushing (1;300) in the cavity (103) using the cap;
   c1): securing a closing element (5) to the blade root (100) in an airtight manner, thereby closing the cavity (103), wherein the closing element (5) comprises a through hole (5a) to pass through a rod (6) and wherein the closing element (5) comprises in secured position one or more openings (5b) between a free face of the closing element (5) and a space between the cavity (103) and the bushing (1;300);
   d): selecting the rod (6) having an inner rod channel (6a) running from a first outer rod end to a second outer rod end and placing the rod (6) in the inner bushing channel (1a), wherein the rod (6) comprises external thread cooperating with the internal thread of the inner bushing channel (1a);
   e): filling the space between the cavity (103) and the bushing (1;300) with a bonding compound to secure the bushing (1;300) in the cavity (103) thereby letting the bonding compound flow through the inner rod channel (6a) while sealing off the inner bushing channel, whereby the bonding compound is inserted in the cavity (103) via a free end of the inner rod channel (6a) by applying a pressure difference between said free end and said openings in the closing element during insertion of the bonding compound, thereby flowing;
   through the inner rod channel (6a);
   through the first through channel of the sealing element (2a;200;400a) and the second through channel of the dispensing element to the end of the cavity (103);
   from the end of the cavity (103) via said dispensing locations towards the first end of the bushing (1;300) thereby filling the space between the cavity (103) and the bushing (1;300);
   through the one or more openings of the closing element (5), thereby exiting the cavity (103) (1a) at the first outer bushing end;
   f): allowing the compound to cure until the bushing (1;300) is secured in the cavity (103);
   g): removing the rod (6) from the bushing (1;300);
   h): flattening the face of the blade root (100) effected by the preceding steps.

2. The method according to claim 1, wherein in sub step c1) the closing element (5) is attached to the first outer bushing end before placing and aligning the bushing (1;300) in the cavity (103).

3. The method according to claim 1, wherein:
   in step d) a sealing ring is used to sealingly connect the inner rod channel (6a) and the first through channel.

4. The method according to claim 1, wherein in sub step bc1) the dispensing element comprises the sealing element (2a;200;400a).

5. The method according to claim 1, wherein in step b) the bushing (1;300) is further selected wherein the bushing (1;300) has a variable cross section along a longitudinal direction.

6. The method according to claim 1, wherein in step c) the bushing (1;300) is wrapped in glass fiber roving (3) before placing and aligning the bushing (1;300) in the cavity (103).

7. The method according to claim 1, wherein in
   step b) a bushing (300) is selected wherein the circumference of the bushing (300) near the first outer bushing end is substantially equal to the inner circumference of the entry of the cavity (103), such that after placement of the bushing (300) in the cavity (103) according to step c), the bushing (300) will substantially seal off an entry of the cavity (103);
   sub step c1) before securing the closing element (5), one or more first dispensing channels (301) are arranged on the outside of the bushing (1;300) near the first outer bushing end, which first dispensing channels (301) are arranged to allow the bonding compound to pass the sealed entry of the cavity (103);
   sub step c1) the closing element (5) is secured to the first outer bushing end such that the one or more openings (5b) of the closing element (5) align with the one or more first dispensing channels (301).

8. The method according to claim 1, wherein the method is further arranged for replacing an existing bushing in the blade root (100), wherein:
   in step a): the cavity (103) in the blade root (100) is created by removing the existing bushing from the blade root (100).

* * * * *